Feb. 18, 1941.  P. H. DIKE  2,232,594
RADIATION PYROMETER
Filed June 23, 1938   4 Sheets-Sheet 1
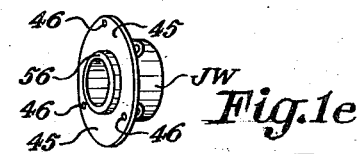
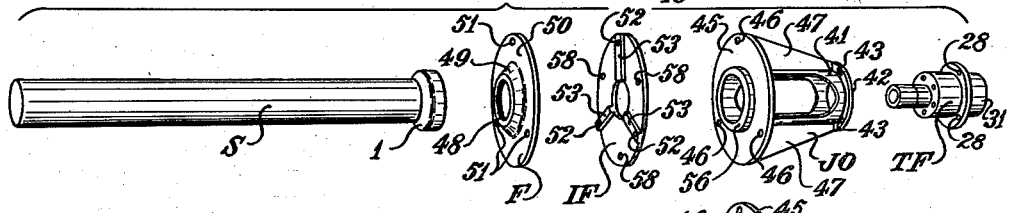
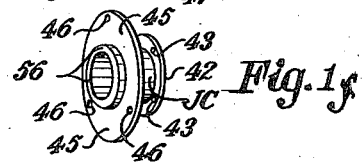
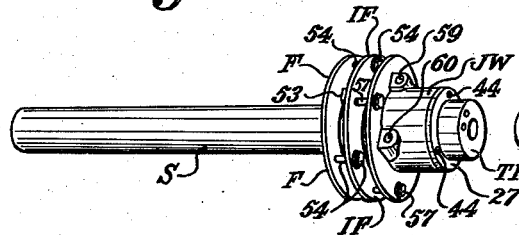
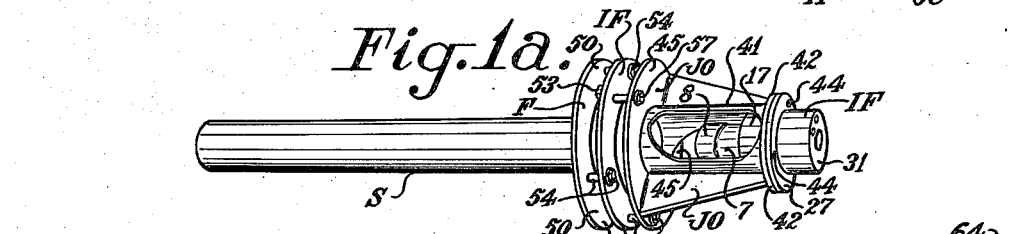
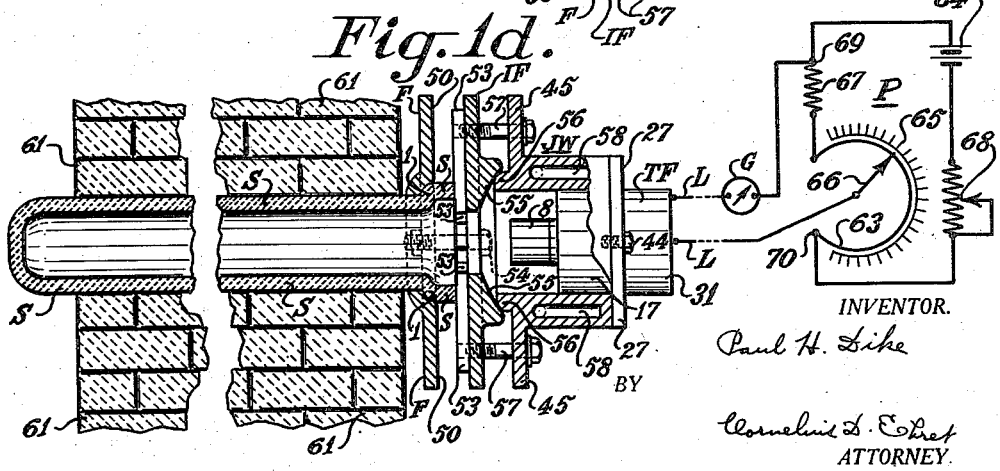
INVENTOR.
Paul H. Dike
BY
Cornelius D. Ehret
ATTORNEY Feb. 18, 1941.  P. H. DIKE  2,232,594
RADIATION PYROMETER
Filed June 23, 1938  4 Sheets-Sheet 2
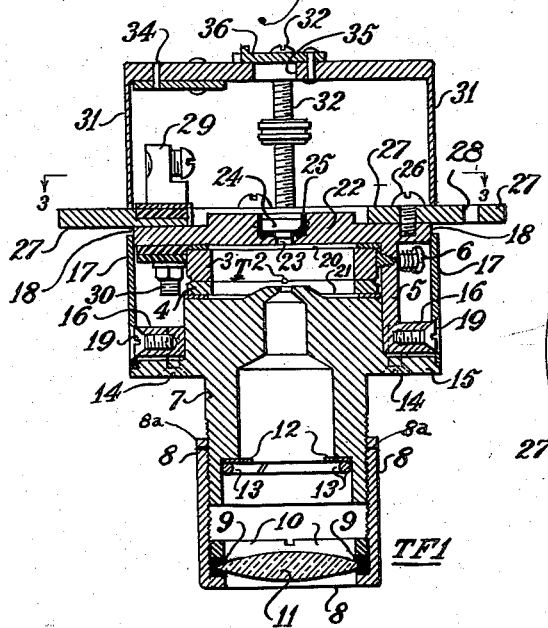
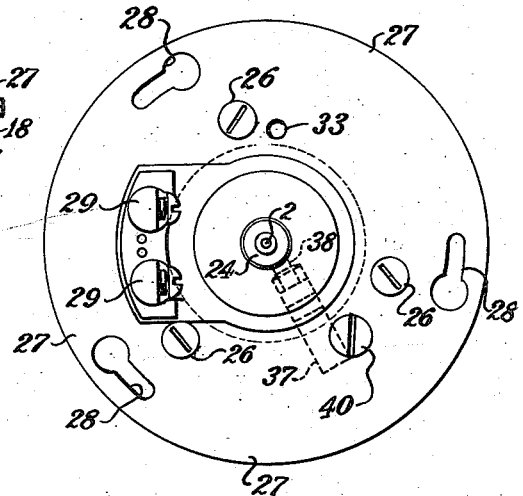
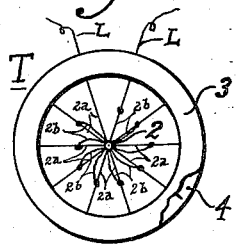
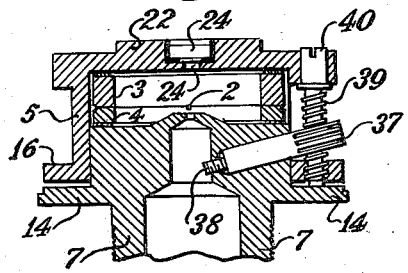
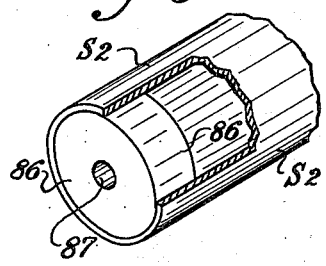
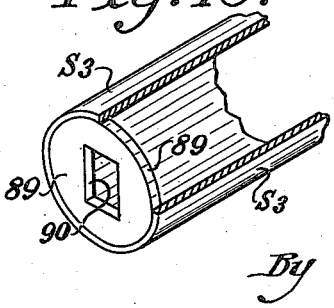

Feb. 18, 1941. P. H. DIKE 2,232,594
RADIATION PYROMETER
Filed June 23, 1938 4 Sheets-Sheet 3
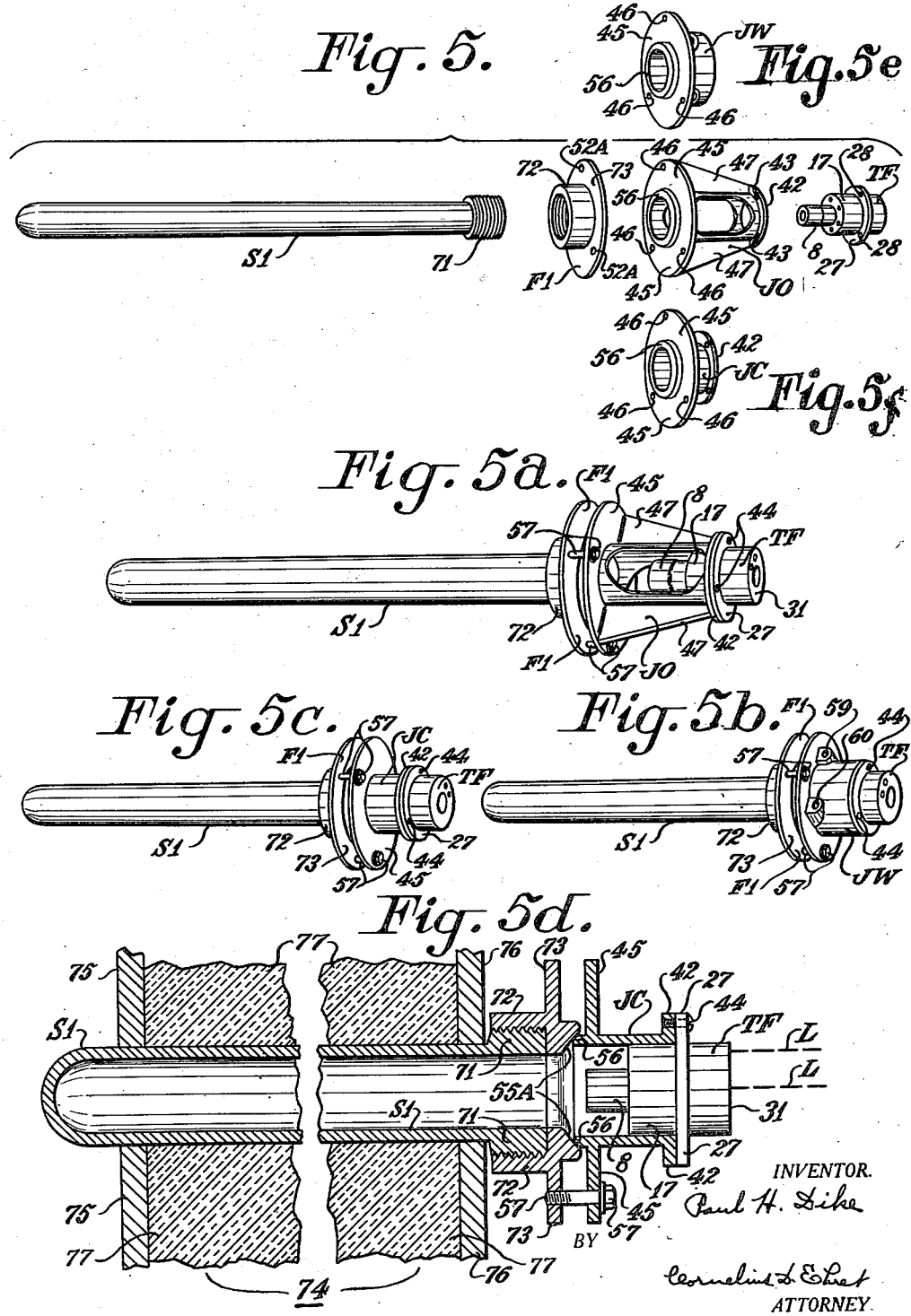
INVENTOR.
Paul H. Dike
BY
Cornelius L. Ebret
ATTORNEY.

Feb. 18, 1941.  P. H. DIKE  2,232,594
RADIATION PYROMETER
Filed June 23, 1938   4 Sheets-Sheet 4
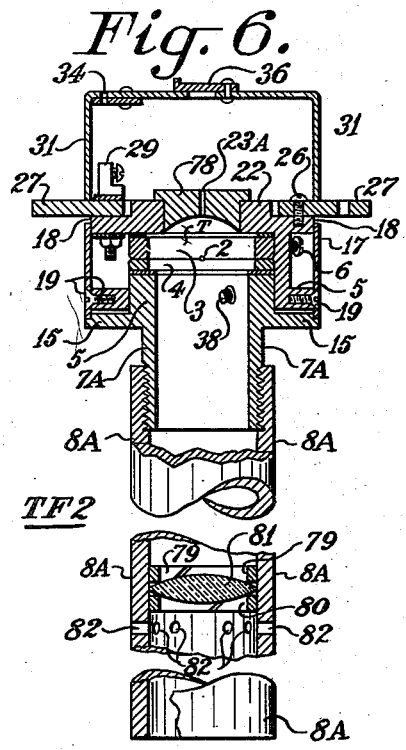
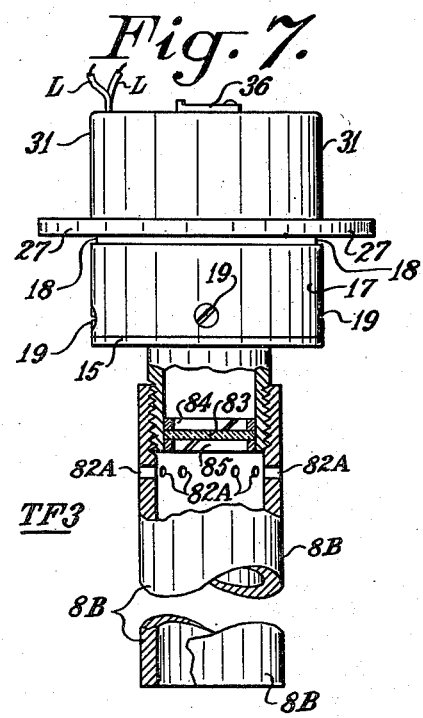
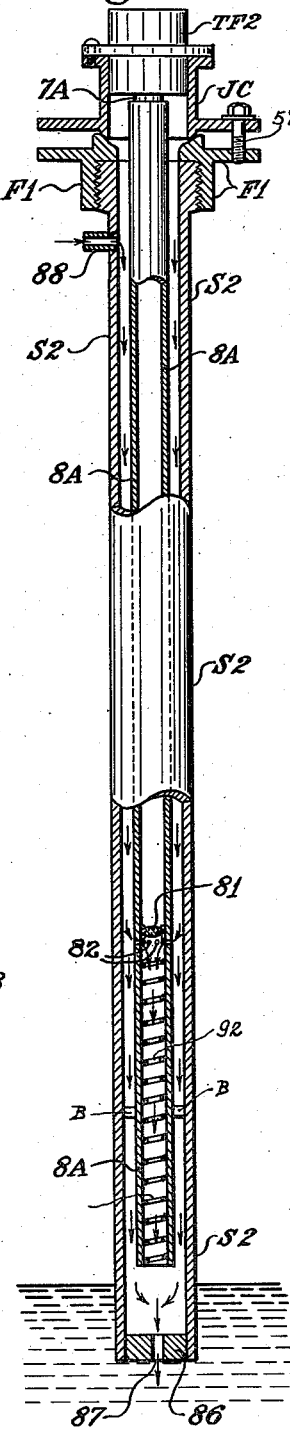
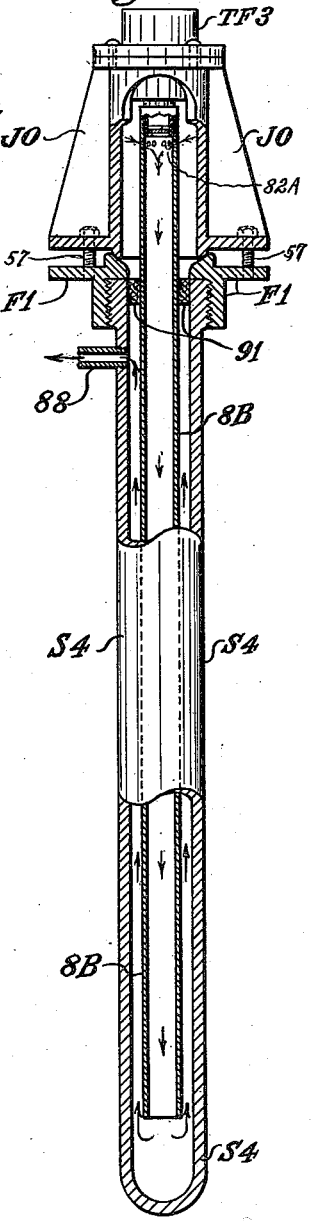
INVENTOR.
Paul H. Dike
By Cornelius D. Ehret
ATTORNEY.

Patented Feb. 18, 1941

2,232,594

UNITED STATES PATENT OFFICE 2,232,594

RADIATION PYROMETER

Paul H. Dike, Philadelphia, Pa., assignor to Leeds and Northrup Company, Philadelphia, Pa., a corporation of Pennsylvania Application June 23, 1938, Serial No. 215,499

9 Claims. (Cl. 73—355)

My invention relates to radiation pyrometers particularly of the type in which radiation, from the closed or field end of a sighting tube or from a hot body at or visible through the open or field-defining end of a sighting tube, is concentrated upon a target consisting of, or intimately thermally related to, the hot junction or junctions of one or more thermocouples which produce an electromotive force utilizable for indicating, recording or control purposes.

In accordance with my invention, the sighting tube and a sub-assembly comprising the thermocouple device and the radiation-focusing system therefor are mechanically joined, preferably by a geometrically rigid connection, to form a detector assembly having a stable radiation-input voltage-output characteristic and whose components may, for calibration purposes, be readily adjusted to and securely held in that relative position for which the focusing system concentrates upon the target of the thermocouple device the radiation from a source at or comprised by the field end of the sighting tube to the exclusion of radiation or reradiation from the side walls of the tube.

Further in accordance with my invention, there are assembled to form a detector unit or assembly, a sighting tube which may be selected more or less at random from interchangeable ceramic tubes or interchangeable metal tubes, a cooling jacket which may be similarly selected from various interchangeable types of cooling jackets, and a selected type of unit or subassembly comprising a thermocouple device and a lens and/or mirror system for focusing radiation upon the target of the thermocouple device; and more particularly, it is provided that for any selected grouping of components to form a detector, the radiation-input voltage-output characteristic may be made to conform with that upon which standardized temperature scales or recording sheets are based.

My invention further resides in the features of construction, combination and arrangement hereinafter described and claimed.

For an understanding of my invention, reference is to be had to the accompanying drawings in which:

Figs. 1, 1e and 1f, in perspective, show various detector components;

Figs. 1a, 1b and 1c, in perspective, illustrate different forms of detectors assembled from the components shown in Figs. 1, 1e and 1f;

Fig. 1d diagrammatically illustrates a radiation pyrometer installation including, partly in section, the detector assembly shown in Fig. 1b;

Fig. 2 is an elevational view, on enlarged scale and in section, of a detector component or sub-assembly comprising a thermocouple device and a lens system;

Fig. 2a is a plan view of the thermocouple unit of Fig. 2;

Fig. 3 is a top plan view of Fig. 2 with cover omitted;

Fig. 4 is an elevational view in section, of parts appearing in Fig. 2;

Fig. 5, in perspective, shows another group of detector components;

Figs. 5a, 5b and 5c illustrate different forms of detectors assembled from components shown in Figs. 5, 5e and 5f;

Fig. 5d is an elevational view, in section, showing the detector illustrated in Fig. 5c as installed;

Figs. 5e and 5f show modifications of one of the detector components shown in Fig. 5;

Figs. 6 and 7 are elevational views, partly in section, of modified forms of thermocouple, radiation-focusing units or sub-assemblies;

Fig. 8 is an elevational view principally in section, illustrating a detector comprising the unit shown in Fig. 6 and a modified form of sighting tube;

Figs. 9 and 10 in perspective, and partly in section, show the field-defining ends of two additional types of open-end sighting tubes;

Fig. 11 is an elevational view, principally in section, of a detector comprising the unit shown in Fig. 7 and a closed-end sighting tube.

In radiation pyrometry it is desirable that the thermocouple device, the radiation-focusing system, and the sighting tube be comprised in a detector assembly which can be tested and calibrated at the laboratory or factory as a unitary device before installed for commercial use. However, to suit different operating environments and different operating conditions, the detector unit or assembly must assume any one of various different forms and/or be constructed of different materials; for example, the sighting tube for many installations must be of ceramic material such as porcelain, fire-clay, "carborundum" or the like; for other installations the sighting tube may be of metal, such as iron, steel, nickel, "nichrome," or other metals or alloys; for some purposes, the sighting tube has a closed end which serves as a secondary source of radiation whereas for other purposes the tube has an open end whose aperture defines the field from which radiation may be focused on the thermocouple target; in some installations it is necessary or desirable the thermocouple sub-assembly be artificially cooled as by circulation of a cooling liquid; in other installations the thermocouple sub-assembly is exposed for cooling by direct contact with the surrounding air, while in still other installations the thermocouple sub-assembly is air-cooled but more or less isolated from contact with the air: in some cases, the focusing of the radiation is effected by a lens system, in other cases by a mirror system, or by a lens-mirror system.

It is to the advantage of the users and manufacturers of radiation pyrometers that all of the aforesaid detector components be so constructed that to suit any particular installation or use a detector may be assembled by grouping a selected type of sighting tube, a selected type of cooling jacket, and a selected type of thermocouple radiation-focusing sub-assembly.

In assembling the components so selected, it is almost inevitable they are not matched, despite close limits or tolerances in their manufacture, to procure that precise inter-relation of them necessary to provide a detector whose radiation-input voltage-output characteristic corresponds with that temperature-voltage characteristic upon which standardized temperature scales are based. It is therefore provided in accordance with my invention the construction of all the detector components is such that when any selected grouping thereof is effected to form a detector especially suited to certain use and environment the components may be so adjusted that the detector shall have a response characteristic which affords accurate readings of temperature from a standard temperature scale: furthermore, when a plurality of detectors are to be used with a single recording or control instrument, their response characteristics should be identical to avoid need for individual measuring networks or successive compensating adjustments of a network with which the detectors are successively associated.

Referring to Fig. 1, the sighting tube S is generically illustrative of a closed-end ceramic tube of any desired material, such as porcelain, fire-clay, "carborundum," or the like; the open end of the tube is flared to provide a section 1 which in shape more or less approximates a segment of a hollow sphere whose center lies approximately on the longitudinal axis of the tube. This type of sighting tube is usually used when the closed end of the tube is in contact with gases, vapors, or molten materials at very high temperatures, for example upwards of about 2100° F. and/or exposed to atmospheres or molten materials whose corrosive effects prohibit use of metal sighting tubes.

The thermocouple radiation-focusing unit TF is generically illustrative of the sub-assembly or unit TF1, Figs. 2-4, whose radiation-focusing system is of the lens type and of the sub-assemblies TF2, TF3, Figs. 6 and 7 whose radiation-focusing systems use mirrors. Preferably in the thermocouple construction used in all three units TF1, TF2, TF3, the hot junctions of a multiplicity of thermocouples are in intimate heat-conducting relation with a target 2 from which the pairs of thermocouple wires 2a, 2b extend (Fig. 2a) to a supporting or clamping ring structure 3, 4. The thermocouple wires and connections are of course electrically insulated from the metal target disk 2 and the clamping rings 3, 4; the thermocouples are electrically connected in series for enhanced sensitivity. The thermocouple unit T, comprising the clamping rings and thermocouples, is centered within a hollow cylindrical member 5 (Figs. 2, 4 and 6) by three centering screws 6 which pass through threaded holes in member 5 into engagement with the periphery of the clamping ring 3.

Referring to Fig. 2, the bore of the cylindrical member 5 receives the upper end of plug member 7 whose lower end is threaded to receive the focus-adjusting sleeve 8 (Fig. 2) within which is suitably secured, as by cement 9 and clamping ring 10, a lens 11. Sleeve 8 is held in its adjusted position by locking ring 8a. The axial bore of the member 7 is of large diameter at its lower end and at the upper end thereof is of small diameter approximating that of the thermocouple target 2; the change in diameter may be progressive or, as shown, by steps, more or less approximately to conform with the progressively decreasing diameter of the cone of radiation from lens 11 to target 2. A diaphragm 12 is detachably retained in position within the lower end of member 7 by split ring 13; by choice of proper diaphragm, the voltage-outputs for a given range of radiation input may be made approximately to suit any one of various standard temperature scales; precise matching is effected as hereinafter described.

The member 7 is retained in position with respect to the thermocouple unit in any suitable manner; for example, by screws 14 which pass upwardly through the flange 15 of member 7 into the lower flange 16 of the cylindrical member 5. Preferably there is provided the sleeve 17 which snugly fits the flanges 16 and 18 of member 5 and which is held in position by the screws 19 threadably received by the lower flange 16 of member 5. In addition, there are provided the washers 20, 21, of suitable material such as hard fibre which form seals for the opposite ends of the clamping ring structure 3, 4, of the thermocouple unit T and effectively isolate the space defined by the inside of the clamping rings 3, 4, the lower surface of the central portion of upper wall 22 of member 5, the bore of member 7, sleeve 8, and the upper surface of lens 11.

To facilitate centering of the target 2 with respect to the bore of member 7, the upper wall 22 of member 5 is provided with a central aperture 23 which, however, is sealed, to prevent communication of the aforesaid space with atmosphere, by a window 24 held in place by suitable sealing material 25 such as varnish. While target 2 is observed through window 24, the screws 6 are adjusted until target 2 is seen to be in precise alignment with the small opening at the upper end of member 7.

For mounting of the thermocouple-lens sub-assembly thus far described upon any one of the selected cooling jackets hereinafter described, there is attached, as by screws 26, to the upper flange 18 of member 5, the plate 27 having therein several bayonet slots 28, Fig. 3.

The posts 29, 29, for connection of the terminals of the thermocouple to leads L, L from the detector to a suitable indicating system or apparatus, are disposed for access from the upper side of the plate 27, and the studs or screws 30 therefrom extend downwardly through plate 27 and flange 18 of member 5 into the annular space between sleeve 17 and the outer periphery of rings 3, 4. The sleeve 5 is cut away at the portion of its periphery adjacent the lower ends of studs 30 to facilitate connection thereof to the thermocouple leads L, L; suitable insulating sleeves and strips are provided electrically to insulate the studs 30 from the metal parts of the sub-assembly.

The cap 31 is detachably held in position on the upper face of member 27 by screw 32 which extends through the top of the cap and is threadably received by the hole 33 in top plate 27. The cap may be provided with holes 34 for passage of leads from the measuring apparatus to the detector terminal posts 29. The cap 31 may also be provided with a central opening 35, normally closed by shutter 36, to permit visual checking of the alignment of the thermocouple target 2 without need to remove the cap.

For fine adjustment of the response curve of the thermocouple there is provided a rotatable member 37 threadably received by member 7 and whose end 38 to greater or lesser extent projects into a cone of radiation from the lens 11 to the thermocouple target 2. The other end of the member 37 is ribbed to form a pinion in mesh with the threaded member or worm 39 whose upper, slotted end 40 is received by the flange 18 of member 5 and is accessible for adjustment when the cap 31 is removed. By rotating member 39 in one direction or the other, the member 37 is rotated to advance or retract its end 38 and so obstruct more or less of the radiation from lens 11 to the target or hot junction 2 of the thermocouple device.

The thermocouple-lens unit or sub-assembly TF1 may be mounted within any selected one of the three members JW, JO, or JC, Figs. 1, 1e and 1f. The mounting structure JO comprises a cylindrical section 41 of internal diameter suited to receive the sleeve 17 of the unit TF1 and a flange 42 having therein threaded holes 43 for receiving bolts or screws 44 which pass through the slots or holes 28 in the plate 27 of unit TF. The other end of the mounting structure JO is provided with a flange 45 having therethrough holes 46 whose purpose will hereinafter appear. The webs 47 extending between the flanges 42 and 45 serve both as cooling fins and as stiffening members.

Because of the frangible nature of the material of tube S, and for other reasons herein stated, it is not feasible directly to attach the mounting member JO thereto. Consequently there is provided the mounting member F having a central opening 48 suitably large to pass the straight section of tube S, a cupped central section 49 suited to nest with the flared end 1 of tube S, and a flange 50 having holes 51 adapted to register with holes 52 in an intermediate mounting member IF. From one face of the plate-like member IF extend three radial ridges 53 adapted to engage the edge of the open end of tube S when the plates F and IF are drawn together as by the bolts 54, Fig. 1a. Provision of the radial ridges 53 and the cup-like depression in mounting member F permits the tube S to be firmly clamped without danger of breakage. Because usually there are irregularities in the end of ceramic tube S, the plate F and IF are usually neither parallel to each other nor normal to the axis of tube S.

As more clearly appears in Fig. 1d, the face of member IF opposite to that from which the ridges 53 extend is provided with a cup-like depression 55 for affording line contact with the circular rib or projection 56 extending from the flange 45 of the selected mounting structure JO, JW or JC. For attaching the sub-assembly comprising mounting structure JO and the thermocouple lens unit TF to the sub-assembly comprising the tube S and mounting structure consisting of members F and IF, there are provided bolts or screws 57 which pass through holes 46 in member JO and holes 58 in member IF. The coacting surfaces of members IF and JO afforded by the rib 56 of member JO and the cup 55 of member IF in effect form a ball and socket joint. The connection between the two mounting members is geometrically rigid; for each relative adjustment of the three bolts 57, all being drawn tight, there is only one possible position of the axis of member JO and the clamping pressure is equalized. By loosening each bolt in turn and tightening another, the axis of the radiation focusing system of sub-assembly TF can be shifted until the target 2 of the unit TF receives radiation from the closed end of tube S to the substantial exclusion of radiation or reradiation from the side walls of the tube.

In actual installations the ratio of the length of the tube S to its diameter is large; for example, the length of the tube may be of the order of 20 inches and the diameter of the closed end of the tube of the order of about 1 inch. Consequently the angle of radiation is narrow and a slight misalignment of the optical system of unit TF has substantial effect upon the accuracy of the instrument because the radiation which the thermocouple receives is no longer substantially exclusively that from the closed end of the tube but on the contrary is to substantial extent comprised of radiation from the side walls whose temperatures do not correspond with the temperature whose measurement is desired. By providing mountings of the character above described exact alignment of all detector assemblies may be obtained notwithstanding the tubes S of the different detectors may not be identical or uniform, a condition difficult of practical attainment with ceramic tubes.

When the detector assembly of Fig. 1a is installed, the tube S projects through or into the wall of a chamber or duct so that its closed end becomes a source of radiation which is concentrated by the focusing system of the unit TF upon the thermocouple junction. The mounting members F, IF, JO and the unit TF are disposed exteriorly of the chamber or duct and are at substantially lower temperature; the large openings through the cylindrical section 41 of the mounting member JO provide for circulation of air about the unit TF to prevent its temperature from increasing to a magnitude affecting the accuracy of the measurements by reduction of the difference in temperature between the hot and cold junctions of the thermocouple or which might permanently affect the mechanical structure of the unit TF.

For installations in which the air cooling afforded by the mounting JO is insufficient to avoid inaccuracies due to heating of unit TF, the detector assembly shown in Fig. 1b, utilizing flow of a liquid, usually water, for cooling purposes, may be used. This detector assembly is similar to that shown in Fig. 1a except there is utilized a water-cooling jacket JW instead of the air-cooling jacket JO. Referring to Figs. 1, 1e and 1b, the jacket JW, like jacket JO, is provided with a flange 45 having holes 46 through which may be passed the bolts 57 for clamping the sub-assembly comprising the cooling jacket and unit TF to the intermediate mounting member IF; the jacket JW is also provided with a circular rib 56 for line contact with the cup-like depression 55 of the member IF. The other end of member JO is provided with holes for threadably receiving the screws 44 which pass through the flange 27 of the thermocouple radiation-focusing unit TF. As more clearly appears in Fig. 1d, the body section of the mounting JW is cored to provide a passage 58 for circulation of water which enters the passage 58 through one or the other of the openings 59, 60, and discharges from it through the other opening.

A typical installation utilizing the water-cooled detector assembly of Fig. 1b is shown in Fig. 1d; the tube S passes through the wall 61 of a furnace with its closed end extending into the furnace chamber. The radiation from the closed end of the tube, because of the aforesaid adjustment of the components of the assembly, is concentrated or focused upon the target of the thermocouple device within the unit TF to produce an electromotive force whose magnitude, representative of the temperature conditions within the furnace, is measured in any suitable manner, preferably by the potentiometric method. The potentiometer network P (Fig. 1d) comprises a slidewire resistance 63 traversed by current of standardized magnitude supplied from a suitable source of current, such as battery 64. To avoid crowding of the scale 65 associated with the movable contact 66 of the slidewire, there is provided the usual end coil 67. The standard cell usually used during adjustment of the slidewire current to standard magnitude is not shown; it suffices here to say that the rheostat 68 is adjusted to procure a predetermined difference of potential between the points 69 and 70 of the potentiometer network, which potential is substantially equal to or at least not less than the potential developed by the thermocouple for the maximum radiation it is to receive from the closed end of the tube S. For determination of the temperature within the furnace chamber, the contact 66 is adjusted until there is no deflection of galvanometer G, the null deflection indicating balance of the voltage developed by the thermocouple against the voltage drop between terminal 69 and contact 66 of the potentiometer network due to flow of the slidewire current. The balancing of the potentiometer may be effected manually, or by a self-balancing mechanism generally of the type shown in Leeds Patent #1,125,699 or Squibb Patent #1,935,732, which is provided with a scale and a chart, generically represented by scale 65 in Fig. 1d, for indicating and/or recording the temperatures. To avoid the need individually to calibrate or draw every scale and chart, there have been adopted standard scales and charts based upon a selected radiation-input voltage-output characteristic. For accurate indication or recording of temperature, it is therefore essential the various detector assemblies have a response characteristic which conforms with this selected input-output characteristic upon which the scale or chart 65 is based. Because of inevitable mechanical differences, though slight, in the construction of the various detector components, the response characteristic of any given detector assembly, in the absence of the provisions previously described, would not precisely match the scale and so introduce errors in measurement. All of the adjustments previously described may be made at the laboratory or factory so that the user of the system need merely position the detector as an assembled unit at the desired location and connect the leads of the unit to the measuring apparatus with assurance the readings will be accurate.

For installations in which the cooling requirements are less severe, there may be utilized the detector assembly shown in Fig. 1c in which the mounting member JC, Fig. 1f, for the unit TF is similar to the unit JO except the cylindrical section 41C is shorter and is not provided with large openings for flow of cooling air into and out of contact with that portion of the unit TF which is received by the bore of the member JC. Otherwise the construction is similar to that of the mounting members JO and JW and the corresponding parts are identified by the same reference characters.

In many installations the temperatures and/or atmospheres to which the sighting tube is exposed do not enforce the use of ceramic tubes and for such installations there may be utilized a metal sighting tube which, because it can be machined to square off the open end of the tube, makes it possible to use a single mounting member FI, Fig. 5, which replaces or serves the purpose of the two mounting members F, IF of Fig. 1. Depending upon the requirements of particular installations, the sighting tube SI may be made of iron, steel, nickel, "nichrome," or other metals or alloys such as, for example, aluminum-iron alloys produced by the "calorizing" process. Near its open end the tube SI is provided with a section 71 of enlarged diameter which is exteriorly threaded to receive the hub 72 from one face of the mounting member FI; the other face of the mounting member FI is provided with cup-like depression 55A corresponding in purpose and function with the corresponding depression 55 of the mounting member IF of Figs. 1 to 1d.

The flange 73 of member FI is provided with holes 52A corresponding in purpose with the holes 52 of the member IF, Figs. 1–1d. From the components shown in Figs. 5, 5e and 5f, there may be assembled the various types of detector assemblies shown in Figs. 5, 5a, 5b, and 5c utilizing, respectively, the various types of cooling jackets JO, JW and JC whose construction has previously been described.

In Fig. 5d there is shown installed the detector assembly of Fig. 5c; the sighting tube SI extends through the wall 74 of a low temperature furnace, for example one used for carburizing in which the temperatures do not exceed about 1700 degrees F. The inner and outer faces 75, 76 of the wall may be of metal and the space between these plates filled with a suitable heat insulating material 77, in contrast with the wall 61 of the furnace shown in Fig. 1d in which at least the face of the inner wall of the furnace is lined with refractory brick because of the materially higher temperatures involved.

Again the connection between the sighting tube and the thermocouple sub-assembly TF is geometrically rigid; the three screws 57, at vertices of a triangle, may be clamped uniquely and rigidly to fix the relative position of the axis of the tube SI and the axis of the radiation-focusing system. By loosening one screw and tightening another, the axis of unit TF may be shifted until precise alignment is effected; the geometry of the connection equalizes the clamping pressure and precludes undesired accidental relative displacement of the detector components.

In the modified form of thermocouple radiation-focusing unit TF' shown in Fig. 6, those elements which correspond with elements of the unit shown in Figs. 2 to 4 are identified by the same reference characters and for brevity only the differences in construction are discussed. In this unit there is provided a mirror 78 for focusing the radiation upon the target 2 of the thermocouple device T; the mirror may be a block of metal received by the end 22 of the member 5 and whose lower, concave face is polished to a mirror finish. The small hole 23A extending through the block 78 is for viewing the thermocouple target 2 during its centering by adjustment of the screws 6. The member 7A of the unit may be threaded to receive the elongated tube 8A within which, intermediate its ends, may be secured, as by the split rings 79, 80, a lens 81 whose purpose will subsequently appear. The tube 8A, below the lens 81, is preferably provided with one or more holes 82 to provide for flow of a gas, as air, longitudinally of the tube 8A and transversely of the tube adjacent the lens.

The detector sub-assembly TF3 shown in Fig. 7 is identical with that of Fig. 6 except that in lieu of the elongated tube 8A having a lens intermediate its ends there is provided a tube 8B having near its upper ends one or more apertures 82A to permit flow of a gas along the tube and also transversely of the tube immediately below the quartz window 83 suitably retained within the bore of member 7A as by split rings 84, 85. As evident from Figs. 2, 4, 5 and 6, many of the parts of units or sub-assemblies TF1, TF2 and TF3 are interchangeable. Such quartz window may also be used advantageously in the sub-assembly of Fig. 6.

Referring to Fig. 8, the detector assembly comprises the sub-assembly TF2 of Fig. 6, the cooling jacket JC of Fig. 5c, the mounting member F1 of Fig. 5, and an elongated tube S2 whose lower end is closed by a thick plug of metal 86 having therethrough a hole 87 of relatively small diameter; by way of example, the length of tube S2 may be six feet or eight feet, and the diameter of the hole 87 may be about three-quarter inch. With some sacrifice of sensitivity, the sub-assembly TF1 of Fig. 2 may be used instead of TF2. This type of detector assembly is used, in a system generally similar to that described and claimed in U. S. Letters Patent #2,020,019 to Collins et al., for determining the temperatures of molten metal by dipping the lower end of the long tube S2 below the surface of the molten material, while in the furnace or in the pouring ladle, for a brief period of time insufficient to soften or melt the tube because of the large thermal inertia of the plug 86. The lens 81 within the tube 8A produces above the lens a radiant image of the molten material visible to the lens through the hole 87 in the plug 86, and the radiation of this image is focused by the mirror 78 upon the thermocouple target 2. For greater sensitivity, lens 81 may be replaced by a pair of lenses; the lens nearer the plug 86 is so spaced therefrom that the rays from each point of the observed area of molten material are substantially parallel as they pass from that lens to the second one. With either of these lens and mirror arrangements, the sensitivity of the detector is so high that notwithstanding the small area of hot metal viewed by the device, and notwithstanding the great length of the tube S2, an accurate measurement of the temperature of the material may be made in less than about ten seconds, well before there is any effect of the molten material upon the immersed end of the detector to impair the accuracy of the measurements or to soften the tube itself. For this use, to avoid presence below the lens 81 of fumes or gases which would materially absorb radiation and so affect accuracy of the measurements, provision is made for flow of air, or other suitable gas, within the detector assembly; specifically, air, nitrogen, or other suitable gas enters the tube S2 through the inlet 88 at its upper end and flows downwardly through the tube S2 about that section of tube 8A above the lens 81; immediately below the lens, at least some of the moving air, or other gas, enters the tube 8A through the openings 82 and thence passes downwardly through the tube 8A and bubbles out of the detector assembly through the opening 87 at the lower end thereof. This circulating gas serves several purposes in addition to its primary one; it maintains the tube 8A at temperatures below that for which there might be spurious reradiation affecting the measurements; the movement of the air transversely of the tube immediately below the lens keeps its surface clear of deposits which would affect the sensitivity and accuracy of the detector. Three spacing bosses B, attached to tube 8A near its lower end and of height suitable to fit the inner diameter of S2, serve to maintain the alignment of 8A and S2. Tube 8A, being shielded from the high temperature to which S2 is exposed, remains rigid and prevents the sagging of S2. Preferably, the inner surface of tube 8A, below the lens 81, is broken or interrupted, as by grooving it, or as shown, by the spaced turns of a spiral 92 of wire.

By utilizing a sighting tube S3, Fig. 10, whose field-defining end is closed by a disk or plate 89 having a rectangular, field-defining aperture 90, it is possible accurately to measure, or record, the temperature of an axially moving wire or a ribbon of flowing molten material such as metal or glass whose width is insufficient to fill the field defined by the aperture 90, and the measurements will be accurate notwithstanding there may be movement of such ribbon or filament transversely of the axis of the tube. With the rectangular aperture, unlike the usual circular aperture, the length of wire or ribbon visible to the radiation-focusing system does not change if the wire or ribbon moves back and forth transversely with respect to the end of the tube.

The detector assembly shown in Fig. 11 comprises a metal sighting tube S4 having a closed end and an outlet 88 for connection to a suction device or to a substantially vertical pipe serving as a chimney. The detector unit TF3 of Fig. 7 is mounted upon the upper or open end of tube S4 by the jacket JO and the flanged mounting member F1. The tube S4 is at least to substantial extent closed above the gas outlet 88 by a washer 91 of suitable material such as felt, asbestos wool, or the like. Air entering the tube 8B through the inlets 82A flows downwardly through the tube 8B, to prevent it from becoming a source of radiation effective to introduce error into the temperature measurements and to maintain the path of radiation from the closed end of tube S4 to the thermocouple target free of gases and fumes which would otherwise absorb radiation and introduce error by such absorption, and then the air passes upwardly around tube 8B to the outlet 88 at the upper end of tube 84.

What I claim is:

1. A detector unit for a radiation pyrometer comprising a sighting tube having mounting structure at one end thereof, a thermo-electric device, mounting structure cooperative with said first-named mounting structure to position said thermo-electric device adjacent said end of said tube, said mounting structures having coacting surfaces complementarily shaped to maintain their continuous engagement during angular adjustment with respect to the axis of said tube of said device and the second of said mounting structures, and means for securing said mounting structures in desired angular relation to position said thermo-electric device for reception of radiation from the other end of said tube to the substantial exclusion of radiation from the side walls of the tube.

2. A detector unit for a radiation pyrometer comprising a sighting tube having mounting structure about one end thereof, a thermo-electric device, a mounting structure for said thermo-electric device including a cooling jacket, one of said mounting structures having surfaces the center of whose radius of curvature lies along the axis of said tube, and the other of said structures having a coacting surface maintaining continuous engagement with said curved surface during relative movement of said mounting structures about said center of curvature, and means adjustable to vary the angular relation of said mounting structures and to secure them in adjusted position for which said thermo-electric device receives radiation from the other end of said tube to the substantial exclusion of radiation from the side walls of the tube.

3. A detector unit for a radiation pyrometer comprising a sighting tube having a closed end, a mounting element detachably secured to the open end of said tube, a tubular mounting element, a thermo-electric device supported within said tubular mounting element, said mounting elements having co-engaging surfaces which in effect form a ball and socket joint, and means adjustable to vary the angular relations of said mounting elements with respect to the axis of said tube to position said thermo-electric device for reception of radiation from the closed end of said tube to the substantial exclusion of radiation from the side walls of the tube.

4. A detector unit for a radiation pyrometer comprising a sighting tube having mounting structure disposed about one end thereof, a tubular mounting structure, a device secured to said tubular mounting structure and comprising a thermocouple and lens system, said mounting structures complementarily shaped to permit their continuous engagement during variation of the angular relation between the axes of said tube and of said tubular mounting structure, and means adjustable to vary said angular relation and to secure said tube and said tubular mounting element in such position radiation from the field end of the tube is focused by said lens system upon the hot junction of said thermocouple.

5. A detector unit for a radiation pyrometer comprising a ceramic tube having a closed end and whose open end is flared to approximate in form a segment of a hollow sphere, a mounting structure comprising a flanged member having an apertured depression suited to fit the curved end of said tube and a second plate-like element having radial ridges for abutting the open end of said tube, means for securing said elements to clamp the flared end of said tube between them, a tubular mounting element, a thermo-electric device carried thereby, said tubular mounting element and said plate-like element having coacting surfaces suited to remain in continuous engagement during adjustment of the angular relation between the axis of said tube and said tubular mounting element, and adjustable means for varying said angular relation and for securing said tubular mounting element to said plate-like element in such position radiation from the closed end of said tube is received by said thermo-electric device.

6. A detector unit for a radiation pyrometer comprising a metal tube, a flanged mounting member threaded upon an end of said tube, a tubular mounting member embodying a cooling jacket, a thermo-electric device carried by said tubular mounting member, said mounting members having coacting surfaces complementarily shaped to provide for their continuous engagement during adjustment of the angular relation between the axes of said tube and said tubular member, and means adjustable to vary said angular relation and to secure said tubular mounting member in such position said thermo-electric device receives radiation from the other end of said tube.

7. A detector for a radiation pyrometer comprising tubular structure, a thermocouple device having its target disposed substantially in the axis of said tubular structure, a radiation-focusing system for focusing radiation upon said target, and means for varying the radiation-input voltage-output characteristic of said detector to suit a standard temperature scale comprising a member adjustable to project through said tubular structure to greater or lesser extent into the path of radiation from said focusing system to said target.

8. A detector for a radiation pyrometer comprising a ceramic sighting tube having a closed end, a cooling jacket, a sub-assembly received within one end of said jacket and comprising a thermo-electric device and a radiation-focusing system therefor, and means for mechanically connecting said ceramic tube at its open end to the other end of said cooling jacket including means providing for relative angular adjustment of the axes of said tube and said jacket and for distribution of clamping forces imposed on said tube adjacent its open end.

9. A detector for a radiation pyrometer comprising a tubular cooling jacket, a sub-assembly received within one end of said jacket and comprising a thermo-electric device and a radiation-focusing system therefor, a sighting tube, and means for mechanically connecting said sighting tube to said cooling jacket comprising two flanged mounting elements having coacting surfaces shaped to maintain their continuous engagement during relative angular adjustment of the axes of said tube and said jacket, and a plurality of fastening means, each passing through one of said flanged elements threadably to engage the other, adjustable to effect and maintain that angular relation of said tube to said jacket for which radiation from the side walls of said tube is out of the field of said radiation-focusing system.

PAUL H. DIKE.